United States Patent
Kitagawa et al.

(10) Patent No.: US 11,975,551 B2
(45) Date of Patent: May 7, 2024

(54) PRINTER

(71) Applicant: FUJITSU FRONTECH LIMITED, Tokyo (JP)

(72) Inventors: Takeshi Kitagawa, Inagi (JP); Tsuyoshi Yamazaki, Inagi (JP); Hirokatsu Nakamura, Inagi (JP)

(73) Assignee: FUJITSU FRONTECH LIMITED, Tokyo (JP)

( * ) Notice: Subject to any disclaimer, the term of this patent is extended or adjusted under 35 U.S.C. 154(b) by 0 days.

(21) Appl. No.: 17/345,191

(22) Filed: Jun. 11, 2021

(65) Prior Publication Data
US 2021/0300064 A1 Sep. 30, 2021

Related U.S. Application Data

(63) Continuation of application No. PCT/JP2018/047941, filed on Dec. 26, 2018.

(51) Int. Cl.
*B41J 3/50* (2006.01)
*B41J 3/407* (2006.01)
(Continued)

(52) U.S. Cl.
CPC .............. *B41J 3/50* (2013.01); *B41J 3/4075* (2013.01); *B41J 15/04* (2013.01); *G06K 17/0025* (2013.01); *H04N 1/32138* (2013.01)

(58) Field of Classification Search
CPC ... B41J 3/50; B41J 3/4075; B41J 5/04; G06K 17/0025; H04N 1/32138
See application file for complete search history.

(56) References Cited

U.S. PATENT DOCUMENTS

| 8,424,755 B1 | 4/2013 | Irudayam et al. |
| 2006/0104698 A1* | 5/2006 | Koike ............. B41J 13/103 400/605 |

(Continued)

FOREIGN PATENT DOCUMENTS

| JP | 2004-082348 A | 3/2004 |
| JP | 2006-202092 A | 8/2006 |

(Continued)

OTHER PUBLICATIONS

Notice of Reasons for Refusal dated Oct. 19, 2021 in corresponding Japanese PatentApplication No. 2020-562027 (5 pages) (7 pages English Translation).

(Continued)

*Primary Examiner* — David H Banh
(74) *Attorney, Agent, or Firm* — STAAS & HALSEY LLP

(57) ABSTRACT

A printer includes a medium feeding device that is one of different types of medium feeding devices including a first medium feeding device that feeds an elongate medium from a first print medium including the medium, and a second medium feeding device that feeds the medium from a second print medium including the medium and a plurality of wireless communication elements provided at intervals in the longitudinal direction of the medium, and a printing device including a printing portion that performs printing on the medium fed from one of the medium feeding devices. The printing device includes a connector portion that is selectively connectable to the common connection portion of each of the different types of medium feeding devices. The second medium feeding device includes a wireless communication portion that communicates with the wireless communication elements, and a terminal portion that con- (Continued)

nects the wireless communication portion to the printing device.

7 Claims, 7 Drawing Sheets

(51) Int. Cl.
    *B41J 15/04*     (2006.01)
    *G06K 17/00*     (2006.01)
    *H04N 1/32*     (2006.01)

(56) References Cited

U.S. PATENT DOCUMENTS

| | | | |
|---|---|---|---|
| 2008/0112747 A1* | 5/2008 | Koike | B41J 15/044 400/582 |
| 2009/0194588 A1 | 8/2009 | Dennison | |
| 2011/0172805 A1 | 7/2011 | Blanchard, Jr. et al. | |
| 2012/0137315 A1* | 5/2012 | Christopher | H04N 21/4126 725/5 |
| 2014/0062674 A1* | 3/2014 | Koike | G06K 7/10009 358/1.6 |
| 2014/0236338 A1 | 8/2014 | Blanchard, Jr. et al. | |
| 2016/0090261 A1* | 3/2016 | Nagashima | B65H 31/02 271/213 |
| 2016/0162228 A1* | 6/2016 | Ehrhardt, Jr. | G06K 15/40 358/1.15 |
| 2018/0322317 A1 | 11/2018 | Koike | |
| 2021/0300064 A1* | 9/2021 | Kitagawa | B41J 3/50 |

FOREIGN PATENT DOCUMENTS

| | | |
|---|---|---|
| JP | 2013-000953 A | 1/2013 |
| JP | 2013-256069 A | 12/2013 |
| JP | 2014-063476 A | 4/2014 |
| JP | 2015-168154 A | 9/2015 |
| JP | 2017-095283 A | 6/2017 |
| JP | 2018-183929 A | 11/2018 |
| WO | WO 2012/172749 A1 | 12/2012 |

OTHER PUBLICATIONS

International Search Report (Forms PCT/ISA/210, PCT/ISA/220); dated Jan. 29, 2019 in corresponding International Patent Application No. PCT/JP2018/047941 (4 pages) (2 pages English Translation).

Written Opinion; Form PCT/ISA/237; dated Jan. 29, 2019 in corresponding International Patent Application No. PCT/JP2018/047941 (6 pages).

First Notification of Office Action, dated May 30, 2022 in corresponding Chinese Patent Application No. 201880100071.5 (8 pages) (11 pages English Translation).

\* cited by examiner

PRIOR ART ized by an international standard (see FIG. 4).
PRINTER

CROSS-REFERENCE TO RELATED APPLICATION

This application is a continuation application of International Application PCT/JP2018/047941, filed on Dec. 26, 2018 and designating the U.S., the entire contents of which are incorporated herein by reference.

FIELD

The present invention relates to a printer.

BACKGROUND

A printer is known that performs printing on elongate paper provided with radio frequency identifier (RFID) tags. This type of printer includes a printing portion, which performs printing on elongate paper, and a wireless communication portion, which communicates with the RFID tag on each piece of elongate paper. For example, some of such printers are installed in airline service counters in airports, and used to issue baggage tags to be attached to baggage.
Patent Literature 1: Japanese Patent Application Laid-open No. 2015-168154

The elongate paper with RFID to be used as baggage tags, is formed by providing labels for printing on release paper (mount paper). A plurality of labels are arranged in the longitudinal direction of the elongate paper in a separable manner. Each label has an RFID tag located at a predetermined position in the longitudinal direction of the label. The elongate paper is cut into separate sections, each of which includes a label and is used as one baggage tag. The distance between the front end of one piece of elongate paper corresponding to one baggage tag and the center of the RFID tag, is specified by an international standard (see FIG. 4). With the arrangement of the wireless communication portion and the printing portion in a printer of the related art, the distance between the communication position of the wireless communication portion and the print start position of the printing portion, is less than the distance between the front end of a piece of elongate paper and the center of the RFID tag by 10 [mm] or more, for example. This causes the problem that, after the information is transmitted to the RFID tag at the communication position, returning the elongate paper to the print start position in the direction opposite to the transfer direction to perform printing on the elongate paper, reduces the processing speed of communication and printing.

FIG. 7 is a perspective side view for illustrating a problem with a printer of the related art. To solve the problem described above, as illustrated in FIG. 7, a wireless communication portion 131 and a printing portion 121 can be arranged such that the distance between a communication position P101 and a print start position P102 is equal to the distance between the front end of one piece of elongate paper 103a and the center of the RFID tag. In this case, after the information is transmitted to the RFID tag, it is possible to perform printing at the print start position P102 without returning the elongate paper 103a, thereby increasing the processing speed. However, in this configuration, the increased distance between the wireless communication portion 131 and the printing portion 121 may disadvantageously increase the size of printer 101.

SUMMARY

According to an aspect of the embodiments, a printer includes: a medium feeding device that is one of different types of medium feeding devices including a first medium feeding device that feeds an elongate medium from a first print medium including the medium, and a second medium feeding device that feeds the medium from a second print medium including the medium and a plurality of wireless communication elements provided at intervals in a longitudinal direction of the medium; and a printing device including a printing portion that performs printing on the medium fed from one of the medium feeding devices, wherein the different types of medium feeding devices each include a common connection portion to be connected to the printing device, the printing device includes a connector portion that is selectively connectable to the common connection portion of each of the different types of medium feeding devices, and the second medium feeding device includes a wireless communication portion that communicates with the wireless communication elements, and a terminal portion that electrically connects the wireless communication portion to the printing device.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1A:
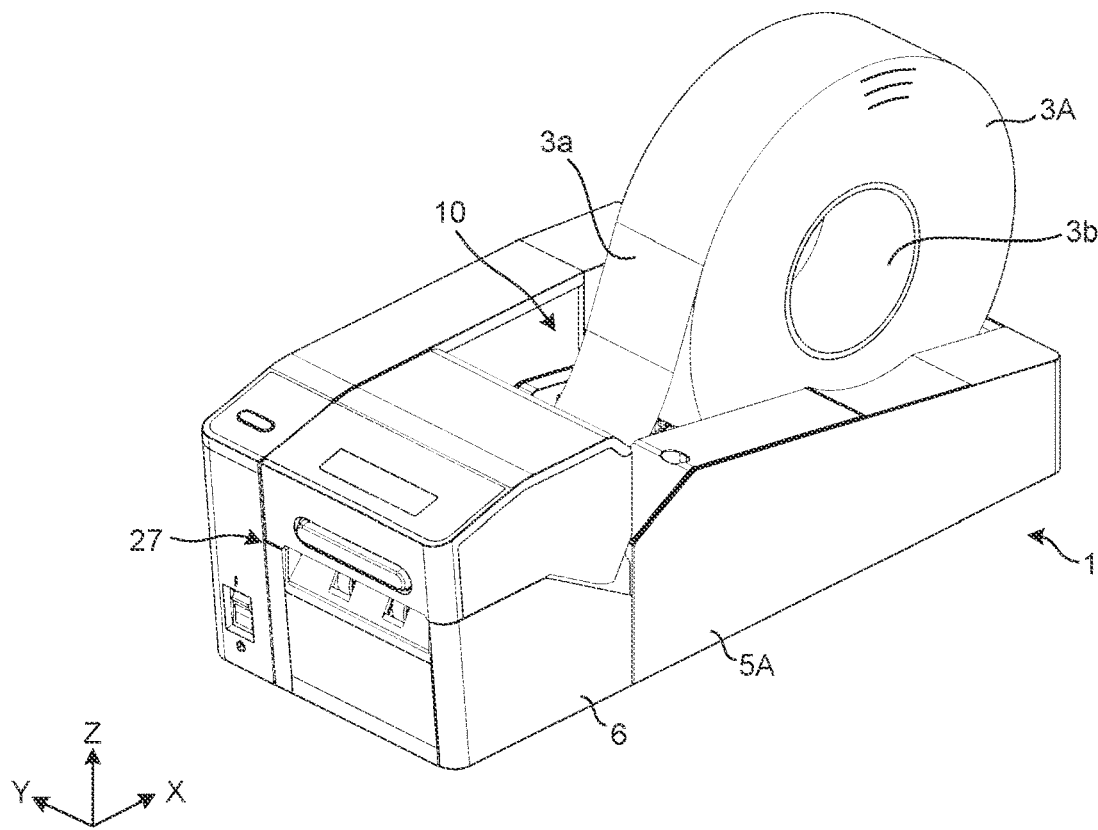
FIG. 1A is a perspective view illustrating a printer of an embodiment that includes a first paper feeding device.

Referring to the drawings, an embodiment of a printer disclosed in the present application is described in detail. The printer disclosed in the present application is not restricted by the following embodiment.

(Printer Configuration)

Figure 1B:
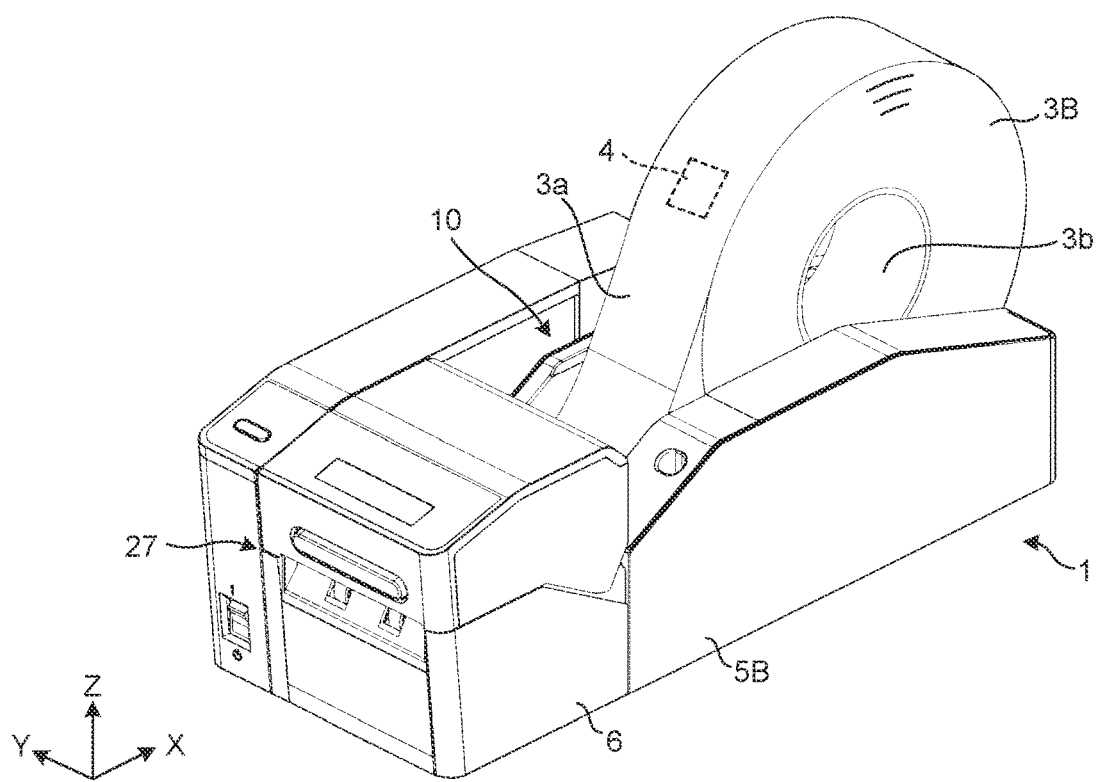
FIG. 1B is a perspective view illustrating the printer of the embodiment that includes a second paper feeding device.
Figure 1C:
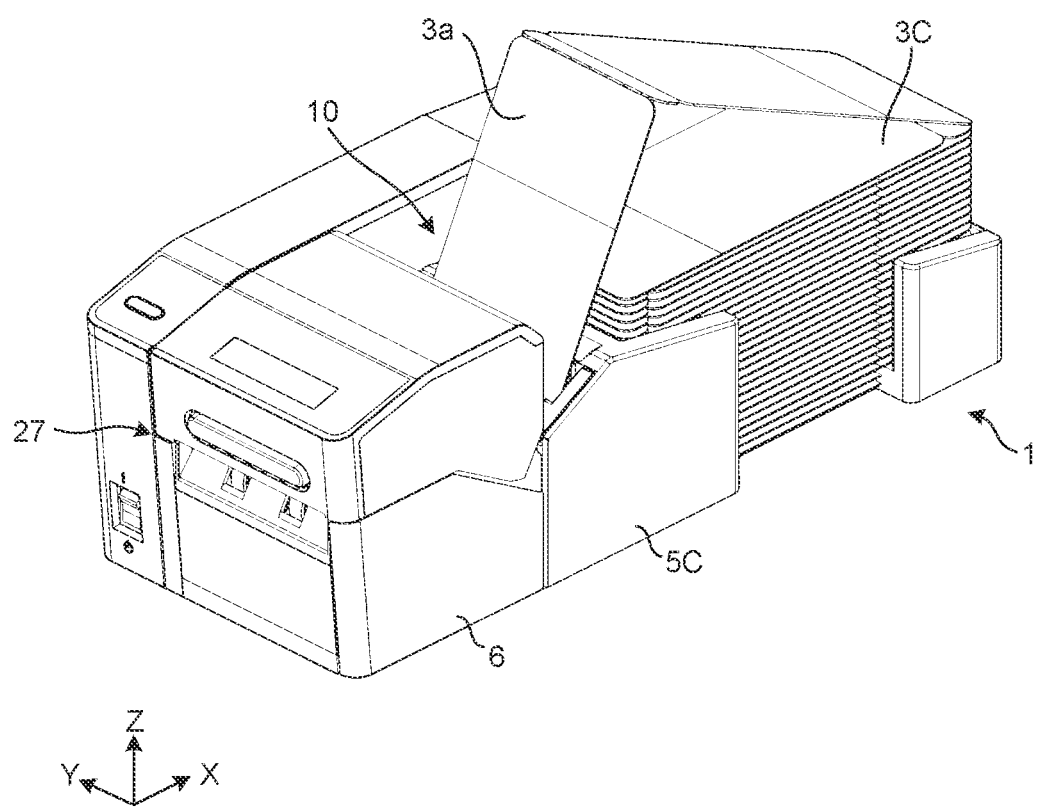
FIG. 1C is a perspective view illustrating the printer of the embodiment that includes a third paper feeding device.

FIG. 1A is a perspective view illustrating a printer of the embodiment that includes a first paper feeding device. FIG. 1B is a perspective view illustrating the printer of the embodiment that includes a second paper feeding device. FIG. 1C is a perspective view illustrating the printer of the embodiment that includes a third paper feeding device.

As illustrated in FIGS. 1A, 1B, and 1C, printer 1 of the embodiment includes; a first paper feeding device 5A, a second paper feeding device 5B, and a third paper feeding device 5C, which are different types of paper feeding devices, and a printing device 6, which is selectively connected to one paper feeding device of the first paper feeding device 5A, the second paper feeding device 5B, and the third paper feeding device 5C. In FIG. 1, the depth direction of the printer 1 is the X direction, the width direction of the printer 1 is the Y direction, and the height direction of the printer 1 is the Z direction. In the drawings following FIG. 1, the X, Y, and Z directions of the first, second, and third paper feeding devices 5A, 5B, and 5C are indicated in the same manner as in FIG. 1.

The printer 1 of the present embodiment may be a printer used for issuing a baggage tag to be attached to baggage in an airport, or a boarding pass on which the flight number, the seat number, and the like of the aircraft of a passenger are recorded. To issue a desired baggage tag or boarding pass, a user selects and uses one of the first, second, and third paper feeding devices 5A, 5B, and 5C, which feed different print media, together with the printing device 6. This allows different types of print media to be used by changing the paper feeding device, which is connected to the printing device 6, as needed. The printer 1 of this embodiment is not restricted to the application for issuing baggage tags or boarding passes, and may be used to create various labels, tags such as price tags, and forms, for example. In this embodiment, printing is not restricted to recording characters. Printing also refers to recording images.

(Configuration of Plurality of Types of Paper Feeding Devices)

Figure 2A:
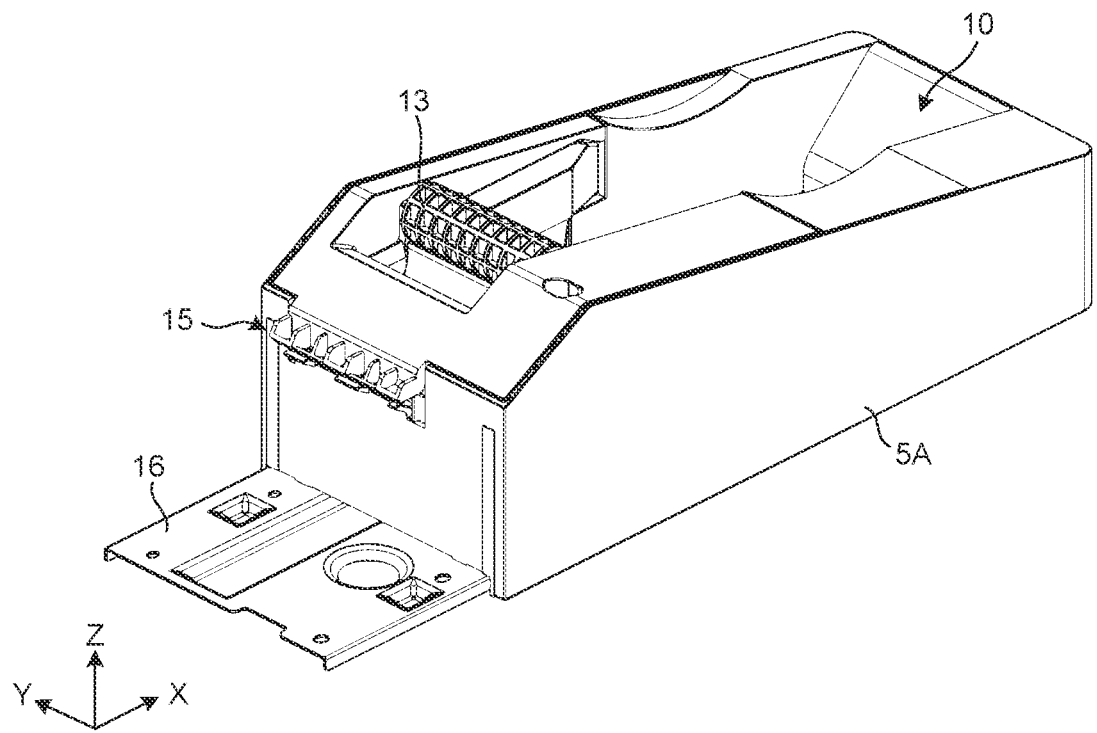
FIG. 2A is a perspective view illustrating the first paper feeding device of the printer of the embodiment.
Figure 2B:
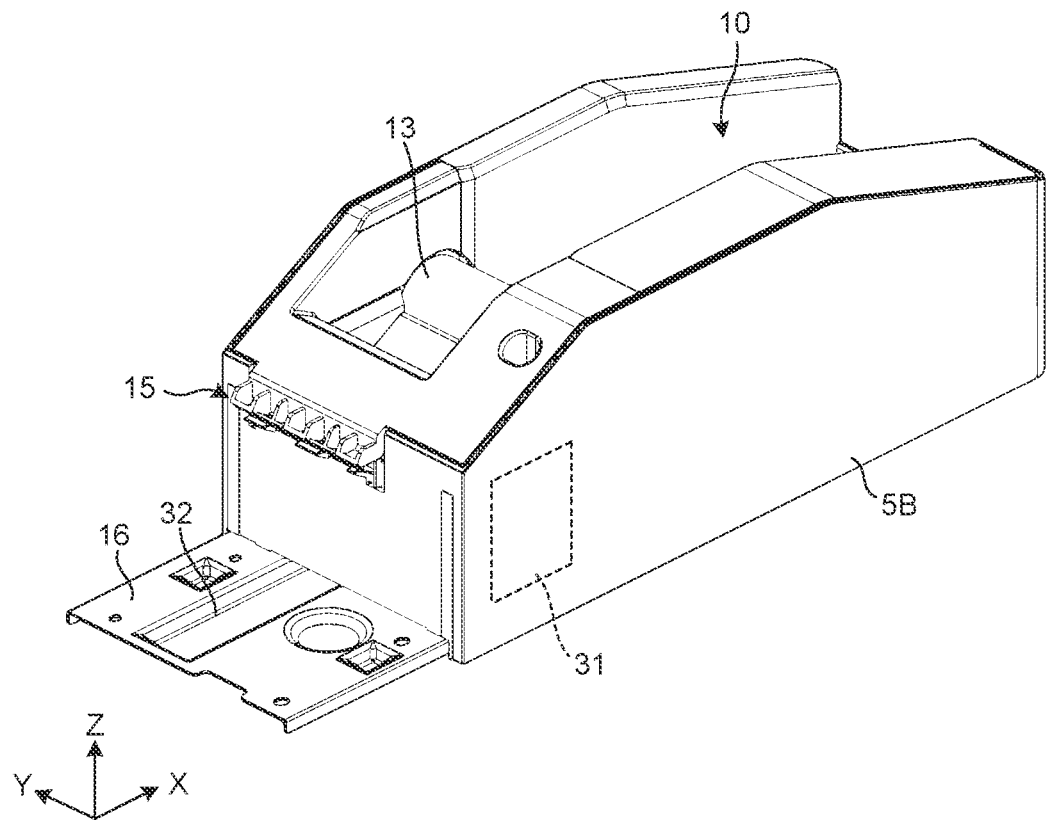
FIG. 2B is a perspective view illustrating the second paper feeding device of the printer of the embodiment.
Figure 2C:
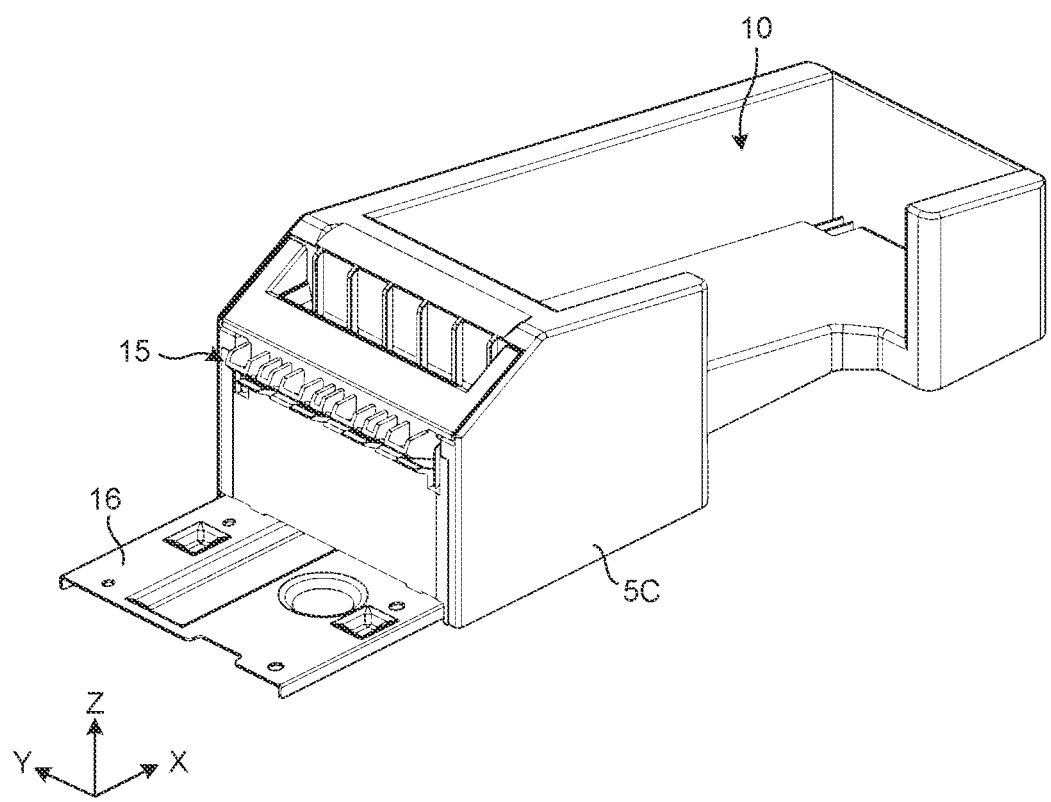
FIG. 2C is a perspective view illustrating the third paper feeding device of the printer of the embodiment.

FIG. 2A is a perspective view illustrating the first paper feeding device 5A of the printer 1 of the embodiment. FIG. 2B is a perspective view illustrating the second paper feeding device 5B of the printer 1 of the embodiment. FIG. 2C is a perspective view illustrating the third paper feeding device 5C of the printer 1 of the embodiment. In the first paper feeding device 5A, the second paper feeding device 5B, and the third paper feeding device 5C, the same components are designated by the same reference numerals.

As illustrated in FIGS. 1A and 2A, the first paper feeding device 5A includes a placement portion 10 on which a paper roll 3A, which serves as a first print medium, is placed. The paper roll 3A includes elongate paper 3a, which serves as an elongate medium, and a core 3b around which the elongate paper 3a is wound. The paper roll 3A is formed by winding the so-called tape-shaped elongate paper 3a, which has a small dimension in the width direction of the paper roll 3A (the Y direction), around the core 3b. The elongate paper 3a is label paper in which labels are arranged over release paper.

The first paper feeding device 5A has a set of support rollers 11A and 11B, which rotatably supports the outer circumference of the paper roll 3A placed on the placement portion 10, and feeds the elongate paper 3a drawn from the paper roll 3A to the printing device 6. The first paper feeding device 5A also includes guide rollers 13, which guide the elongate paper 3a drawn from the paper roll 3A placed on the placement portion 10 to the printing device 6.

As illustrated in FIGS. 1B and 2B, the second paper feeding device 5B includes a placement portion 10 on which a paper roll 3B with RFID, which serves as a second print medium, is placed. The paper roll 3B with RFID includes elongate paper 3a, which is wound around a core 3b, and a plurality of RFID tags 4, which serve as a plurality of wireless communication elements that are provided at intervals in the longitudinal direction of the elongate paper 3a. In the same manner as the paper roll 3A, the paper roll 3B with RFID is also formed by winding the so-called tape-shaped elongate paper 3a around the core 3b. The elongate paper 3a is label paper in which labels 3a1 are arranged over release paper 3a2 (see FIG. 4).

In the same manner as the first paper feeding device 5A, the second paper feeding device 5B has a set of support rollers 11A and 11B, which rotatably supports the outer circumference of the paper roll 3B with RFID that is placed on the placement portion 10, and feeds the elongate paper 3a, which is drawn from the paper roll 3B with RFID, to the printing device 6. Also, in the same manner as the first paper feeding device 5A, the second paper feeding device 5B includes guide rollers 13 that guide the elongate paper 3a, which is drawn from the paper roll 3B that is placed on the placement portion 10, to the printing device 6.

The main part of the second paper feeding device 5B and the main part of the paper roll 3B with RFID, will be described below.

As illustrated in FIGS. 1C and 2C, the third paper feeding device 5C includes a placement portion 10 on which continuous paper 3C, which serves as a third print medium, is placed. The continuous paper 3C is so-called fan-fold paper in which elongate paper 3a is folded in a zigzag in the longitudinal direction. The third paper feeding device 5C feeds the elongate paper 3a, which is drawn from the continuous paper 3C, to the printing device 6.

As illustrated in FIGS. 2A, 2B, and 2C, the first paper feeding device 5A, the second paper feeding device 5B, and the third paper feeding device 5C configured as described above each include a paper feed port 15 to be connected to a transfer passage 23a, which will be described below, included in the printing device 6, and a common connection portion 16 to be connected to the printing device 6. The common connection portions 16 have the same shape, and are located at the same position, so as to be common to the first paper feeding device 5A, the second paper feeding device 5B, and the third paper feeding device 5C. The common connection portion 16 is arranged below the paper feed port 15, and projects toward the printing device 6.

In this embodiment, as the paper roll 3A and the paper roll 3B with RFID, paper rolls in which the elongate paper 3a is wound around the cores 3b, are used. However, they are not restricted to those with the cores 3b, and a paper roll without the core 3b may also be used.

(Configuration of Printing Device)

Figure 3:
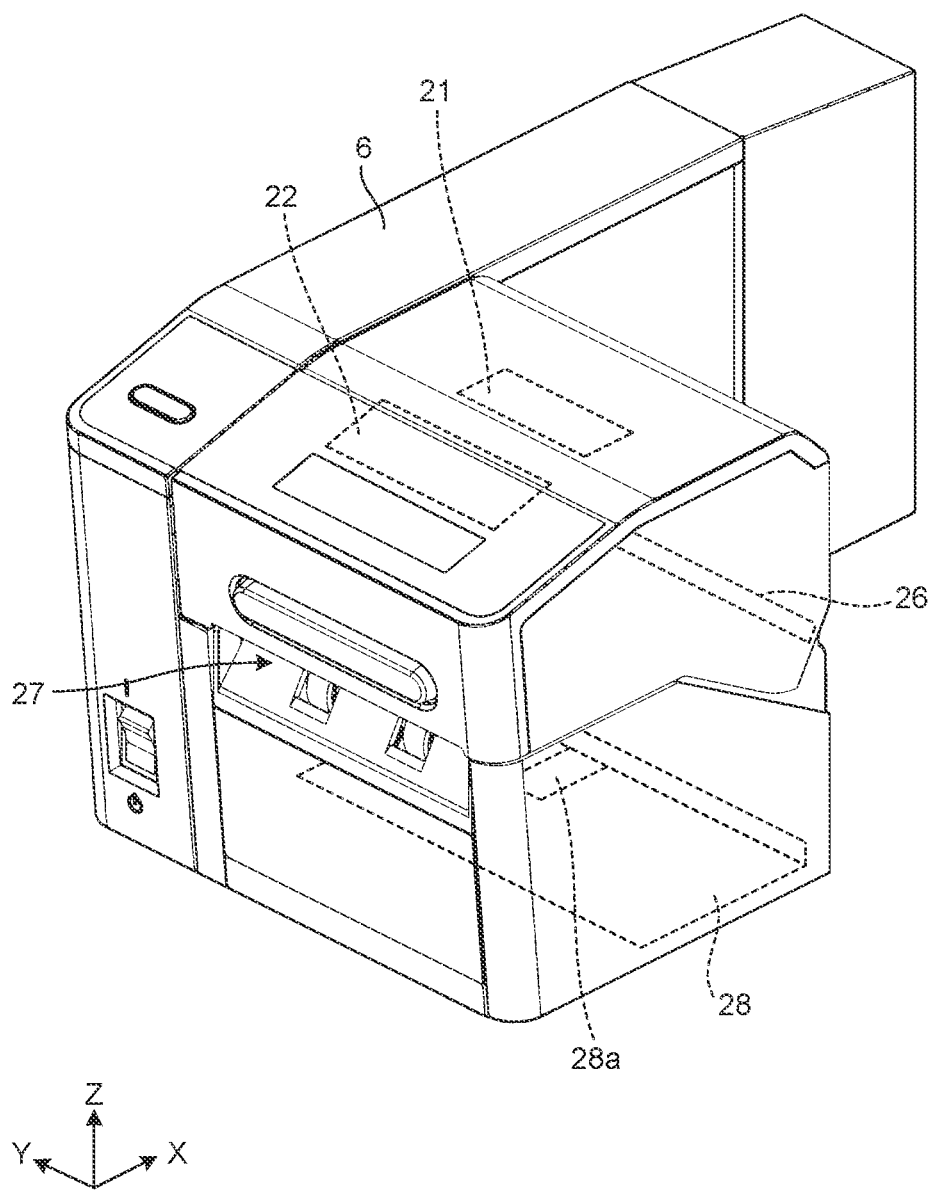
FIG. 3 is a perspective view illustrating a printing device of the printer of the embodiment.
Figure 6:
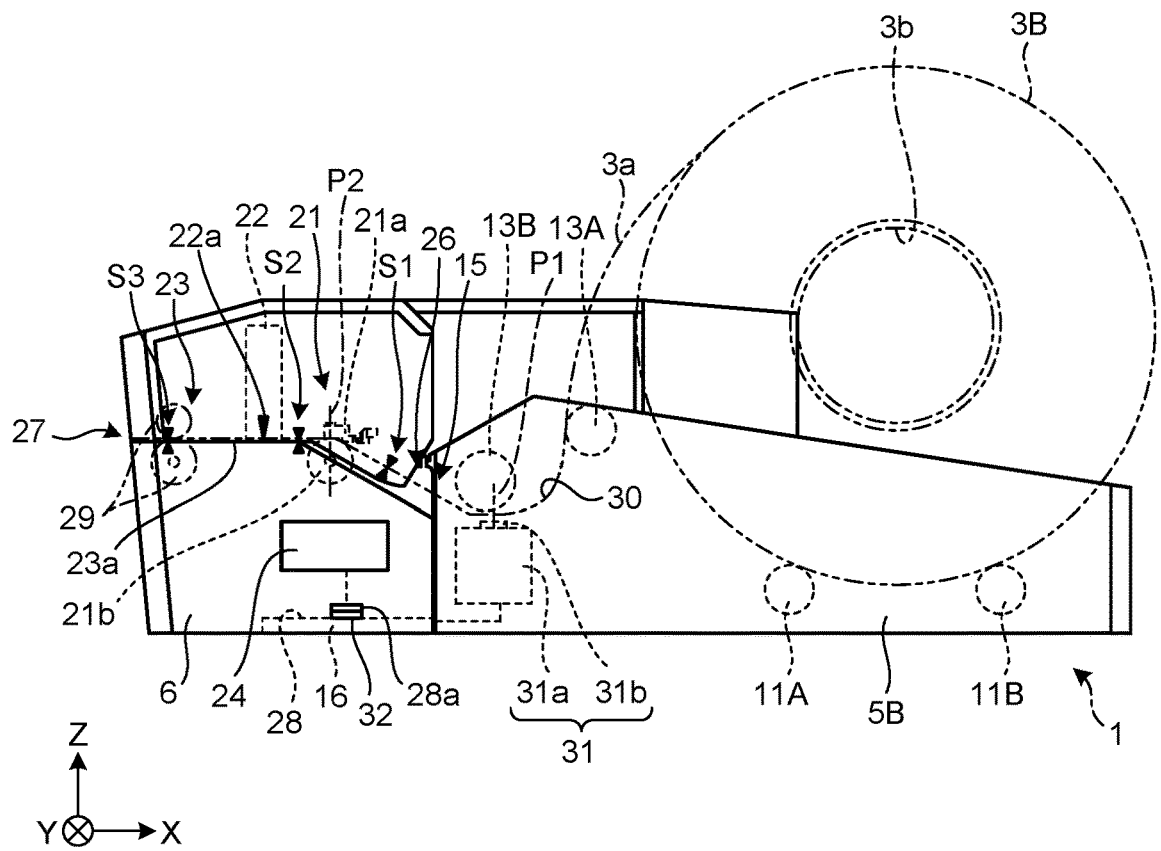
FIG. 6 is a perspective side view for illustrating the main part of the printer of the embodiment.
Figure 7:
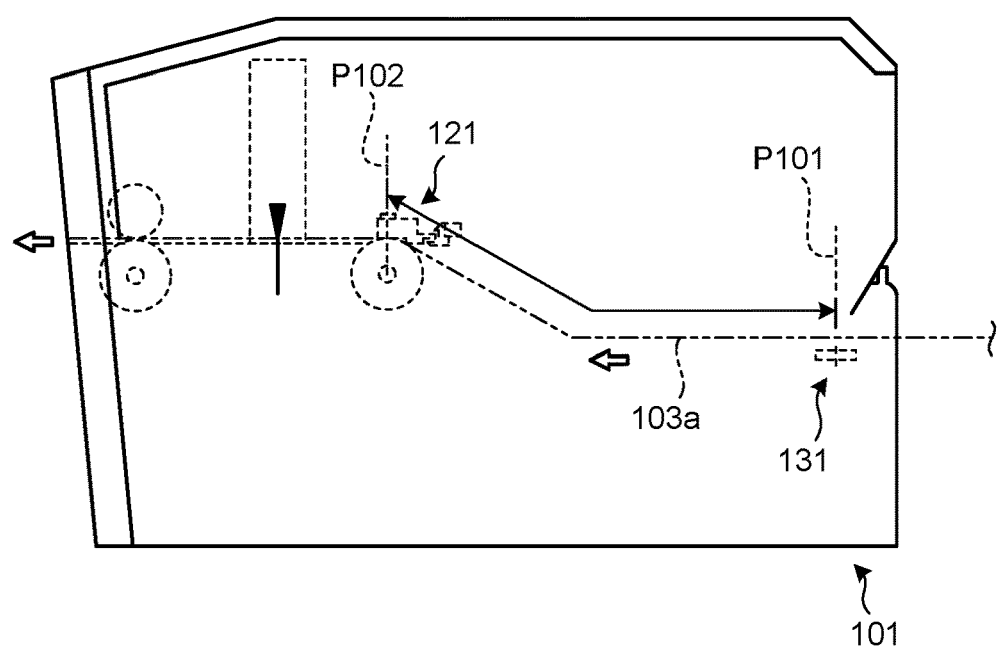
FIG. 7 is a perspective side view for illustrating a problem with a printer of the related art.

FIG. 3 is a perspective view illustrating the printing device 6 of the printer 1 of the embodiment. For the convenience of description, the printing device 6 is described referring also to FIG. 6, which will be described below. As illustrated in FIGS. 3 and 6, the printing device 6 includes a printing portion 21, which performs printing on labels 3a1 of the elongate paper 3a, a cutter portion 22, which cuts the elongate paper 3a into labels 3a1, a transfer mechanism 23, which transfers the elongate paper 3a along the transfer passage 23a, and a control circuit 24, which controls the printing portion 21, the cutter portion 22, the transfer mechanism 23, and the like.

In addition, the printing device 6 includes a connection port 26 to be connected to the paper feed ports 15 of the first, second, and third paper feeding devices 5A, 5B, and 5C, a paper ejection port 27, through which the elongate paper 3a cut by the cutter portion 22 is ejected, and a connector portion 28, to which the common connection portions 16 of the first, second, and third paper feeding devices 5A, 5B, and 5C are connected.

As illustrated in FIG. 6, the printing portion 21 includes a thermal head 21a and a platen roller 21b, which sends the elongate paper 3a sandwiched between the platen roller 21b and the thermal heads 21a. The cutter portion 22 is arranged on the downstream side of the printing portion 21 in the transfer passage 23a, and has a cutter 22a, which cuts the rear end of each label 3a1. The cutter portion 22 forms a cut between pieces of elongate paper 3a (labels 3al) to be separated as individual baggage tags, so that a piece of elongate paper 3a is cut away by hand when the elongate paper 3a is ejected from the paper ejection port 27. The transfer mechanism 23 has a set of transfer rollers 29. The set of transfer rollers 29 is arranged in the vicinity of the paper ejection port 27. The connector portion 28 includes a connector 28a, which is to be electrically connected to a terminal portion 32, which will be described below, of the second paper feeding device 5B. The connector 28a is electrically connected to the control circuit 24, and the control circuit 24 controls the second paper feeding device 5B via the connector 28a.

The printing device 6 includes a first position sensor S1, which detects the elongate paper 3a that is taken in through the connection port 26, a second position sensor S2, which detects the elongate paper 3a that passes through the printing portion 21, and a third position sensor S3, which detects the elongate paper 3a that is ejected through the paper ejection port 27. The first position sensor S1 is arranged in the transfer passage 23a between the connection port 26 and the thermal head 21a of the printing portion 21, and can detect the elongate paper 3a that is taken in through the connection port 26. The second position sensor S2 is arranged in the transfer passage 23a between the printing portion 21 and the paper ejection port 27, and can detect the rear end of the elongate paper 3a that passes through the printing portion 21. The third position sensor S3 is arranged in the vicinity of the paper ejection port 27 in the transfer passage 23a, and can detect the rear end of the elongate paper 3a that is ejected through the paper ejection port 27. Optical sensors are used as the position sensors S1, S2, and S3, and the control circuit 24 is electrically connected to the position sensors S1, S2, and S3. There is no restriction to the positions on the elongate paper 3a to be detected by the position sensors S1, S2, and S3. The detection position may be switched so that the front end or the rear end of the elongate paper 3a is detected according to various transfer operations.

The printer 1 may be configured such that the control circuit 24 identifies the type of the paper feeding device, for example, by transmitting and receiving information to and from the paper feeding device that is connected to the connector portion 28 through its common connection portion 16.

Details of the paper roll 3B with RFID and the second paper feeding device 5B relating to the features of the present disclosure, are now described.

(Configuration of Paper Roll with RFID)

Figure 4:
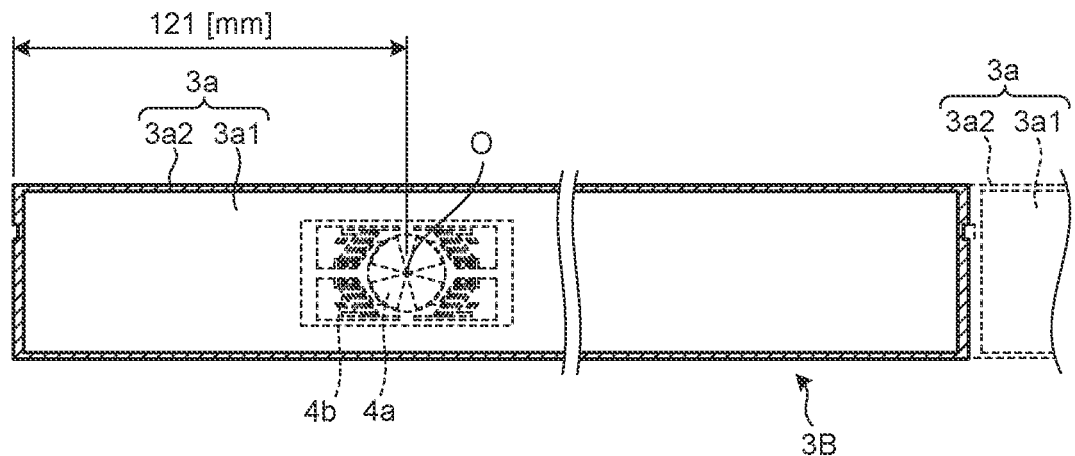
FIG. 4 is a plan view illustrating a paper roll with RFID supported by the second paper feeding device of the embodiment.

FIG. 4 is a plan view illustrating the paper roll 3B with RFID supported by the second paper feeding device 5B of the embodiment. As illustrated in FIG. 4, the elongate paper 3a of the paper roll 3B with RFID includes labels 3al for printing and release paper 3a2 on which the labels 3al are arranged. The labels 3al are arranged in the longitudinal direction of the elongate paper 3a to be dividable. Each label 3al has long sides and short sides that are set to be smaller than the outer dimensions of a piece of release paper 3a2 to be individually cut. An RFID tag 4 is arranged on each label 3al at a predetermined position in the longitudinal direction of the label 3a1. The RFID tag 4 includes a semiconductor chip 4a, which stores therein information, and an RF antenna 4b for transmitting and receiving information.

In a section into which the elongate paper 3a is cut as a piece of paper, that is, in one baggage tag including one label 3a1, the distance between the front end of the release paper 3a2 in the transfer direction of the elongate paper 3a and the center O of the RFID tag 4, is set to 121 [mm] by the international standard. In one example of a baggage tag, the total length of the release paper 3a2 including one label 3al, is set to about 500 [mm], but there is no restriction to the total length of the baggage tag. In addition, the distance between the front end of the release paper 3a2 and the front end of the label 3al, and the distance between the rear end of the release paper 3a2 and the rear end of the label 3al, are set to about 1.5 [mm].

(Main Part of Second Paper Feeding Device)

Figure 5:
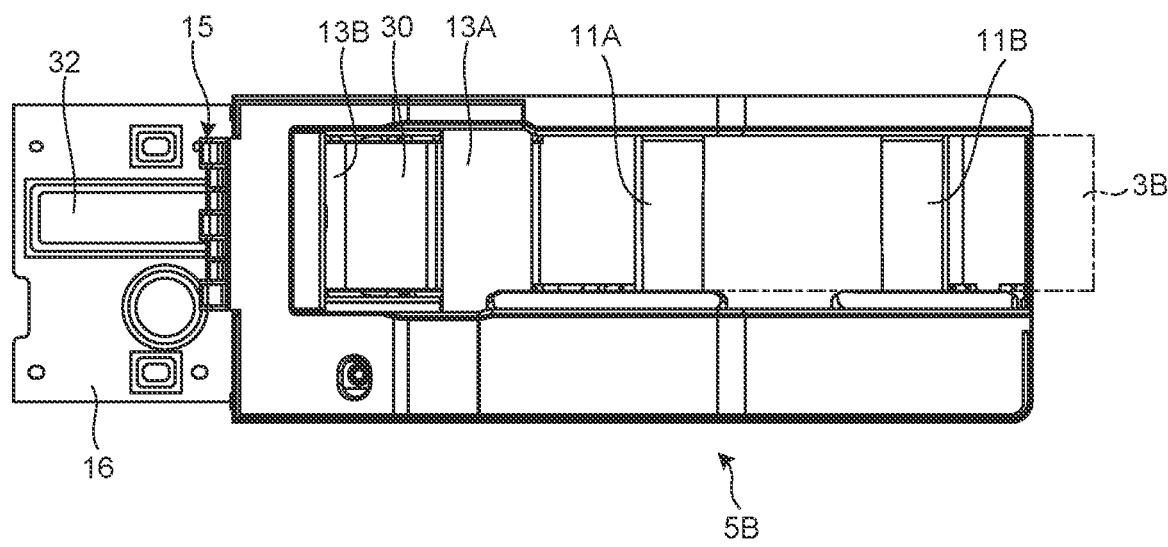
FIG. 5 is a plan view illustrating the second paper feeding device of the embodiment.

FIG. 5 is a plan view illustrating the second paper feeding device 5B of the embodiment. FIG. 6 is a perspective side view illustrating the main part of the printer 1 of the embodiment. As illustrated in FIGS. 5 and 6, the second paper feeding device 5B includes a first guide roller 13A and a second guide roller 13B, which are guide rollers 13 for guiding the elongate paper 3a, and a transfer passage 30, which transfers the elongate paper 3a drawn from the paper roll 3B from the first guide roller 13A to the second guide roller 13B. The second paper feeding device 5B also includes an RFID interrogator 31, which serves as a wireless communication portion that communicates with RFID tags 4.

The RFID interrogator 31 has a transmitting and receiving circuit 31a and an RF antenna 31b for transmitting and receiving information to and from RFID tags 4. The RF antenna 31b is connected to the transmitting and receiving circuit 31a, and is arranged in the vicinity of the transfer passage 30, through which the RFID tag 4 of the elongate paper 3a that is drawn from the paper roll 3B with RFID passes. The RF antenna 31b arranged in the vicinity of the transfer passage 30 may be arranged at a position where the RF antenna 31b faces the second guide roller 13B.

The RFID interrogator 31 transmits to an RFID tag 4 the ID information including print information to be printed on the label 3al of the elongate paper 3a. The RF antenna 31b is provided with a radio wave shield. When the RFID interrogator 31 communicates with the RFID tag 4, radio waves that would otherwise affect the other RFID tags 4, which are wound in the paper roll 3B with RFID, are blocked.

The common connection portion 16 of the second paper feeding device 5B includes a terminal portion 32, which electrically connects the RFID interrogator 31 to the connector portion 28 of the printing device 6. The terminal portion 32 is electrically connected to the transmitting and receiving circuit 31a of the RFID interrogator 31. When the common connection portion 16 of the second paper feeding device 5B is connected to the connector portion 28 of the printing device 6, the RFID interrogator 31 is electrically connected to the control circuit 24 of the printing device 6 via the terminal portion 32. This allows the control circuit 24 of the printing device 6 to control the RFID interrogator 31 of the second paper feeding device 5B.

The terminal portion 32 of the second paper feeding device 5B may be independent of the common connection portion 16, and extend from the second paper feeding device 5B via a wiring cord. For example, an interface such as a universal serial bus (USB), universal asynchronous receiver/transmitter (UART), or serial peripheral interface (SPI), may be used. In this case, the printing device 6 has a connector to which a terminal corresponding to the interface is connected.

When issuing a baggage tag using the paper roll 3B with RFID, for each section of the elongate paper 3a corresponding to one baggage tag, the printer 1 communicates with the RFID tag 4, and then performs printing on the labels 3al. One section of the elongate paper 3a is thus ejected as a baggage tag.

In this embodiment, the transmitting and receiving circuit 31a and the RF antenna 31b of the RFID interrogator 31, are provided in the second paper feeding device 5B, but only the RF antenna 31b may be provided in the second paper feeding device 5B, and the transmitting and receiving circuit 31a may be provided in the printing device 6.

(Relative Positions of RFID Interrogator of Second Paper Feeding Device and Printing Portion of Printing Device)

The printer 1 is now described in which the second paper feeding device 5B is connected to the printing device 6 as illustrated in FIG. 6. In the transfer direction in which the paper roll 3B with RFID is transferred from the second paper feeding device 5B to the printing device 6 (the longitudinal direction of the elongate paper 3a), the distance between a communication position P1, at which the RFID interrogator 31 communicates with the RFID tag 4 with the transfer of the elongate paper 3a being stopped, and a print start position P2, at which the thermal head 21a of the printing portion 21 starts printing on the label 3al of the elongate paper 3a, is equivalent to the distance between the front end of the elongate paper 3a in the transfer direction of the elongate paper 3a and the center O of the semiconductor chip 4a of the RFID tag 4 in the transfer direction of the elongate paper 3a.

The situation in which the distance between the communication position P1 and the print start position P2 is equivalent to the distance between the front end of the elongate paper 3a and the center O of the RFID tag 4 (121 [mm]), is preferably a situation in which these distances are the same. However, the situation also includes a situation in which the distance between the communication position P1 and the print start position P2 is greater than the distance between the front end of the elongate paper 3a and the center of the RFID tag 4 by about several [mm], for example by about 1 [mm], depending on the requirements in the handling of the elongate paper 3a, for example. In this situation, after the communication with the RFID tag 4, the label 3a1 of the elongate paper 3a can be transferred to the print start position P2 by forwarding the elongate paper 3a by about 1 [mm] in the transfer direction.

As described above, since the distance between the communication position P1 and the print start position P2 matches with 121 [mm], which is the international standard for one baggage tag, the printer 1 of the embodiment does not have to return the elongate paper 3a to the print start position P2 of the label 3al in the direction opposite to the transfer direction of the elongate paper 3a after communicating with the RFID tag 4, as compared to a printer in which the distance between the print start position P2 and the communication position P1 is short. This shortens the time needed for printing after the communication, thereby increasing the processing speed of communication and printing.

By arranging the RFID interrogator 31 in the second paper feeding device 5B, which is selectively connected to the printing device 6, the printer 1 can secure the distance between the communication position P1 and the print start position P2, and also limit an increase in size of the printing device 6.

Since the RFID interrogator 31 is provided in the second paper feeding device 5B, which is connected when RFID tags 4 are used, an increase in the overall size of the printer 1 is also limited, when RFID tags 4 are not used and the printing device 6 is connected to the first paper feeding device 5A or the third paper feeding device 5C, as compared to a configuration in which the RFID interrogator 31 is arranged in the printing device 6.

Furthermore, a user, who does not use RFID tags 4, can retrofit the second paper feeding device 5B when RFID tags 4 are needed to be used. This increases the expandability of the printer 1, since the operation of incorporating the RFID interrogator into the printing device and the replacement with a printing device equipped with an RFID interrogator are avoided. Moreover, the printer 1 uses the printing device 6, which is common to different types of paper feeding devices irrespective of the use of RFID tags 4. This increases the serviceability of the printer 1.

(Operation of Printer with Second Paper Feeding Device)

Referring to FIG. 6, the operation of the printer 1, in which the second paper feeding device 2B is connected to the printing device 6, is now described. As illustrated in FIG. 6, the printer 1 detects the front end of the elongate paper 3a, which is fed through the paper feed port 15 of the second paper feeding device 5B with the position sensor S1, transfers the elongate paper 3a to the position where the center O of the RFID tag 4 of the elongate paper 3a coincides with the communication position P1, and stops the elongate paper 3a. At this time, the front end of the label 3al of the elongate paper 3a is stopped at the position that coincides with the print start position P2 of the thermal head 21a of the printing portion 21.

After communicating with the RFID tag 4 at the communication position P1, the printer 1 transfers the elongate paper 3a, while performing printing on the label 3al, immediately from the print start position P2 with the thermal head 21a of the printing portion 21. The printer 1 partially cuts the rear end of the printed label 3al with the cutter portion 22 to eject the label 3a1 that can be separated from the other labels 3a1 through the paper ejection port 27 as a baggage tag.

In addition, when the RFID interrogator 31 transmits information to the RFID tag 4, the control circuit 24 of the printer 1 determines whether the RFID interrogator 31 has successfully communicated with the RFID tag 4 by receiving the information stored in the RFID tag 4. The control circuit 24 may determine whether the communication with the RFID tag 4 has been successfully performed, based on the result of multiple communication events between the RFID interrogator 31 and the RFID tag 4.

When determining that the communication with the RFID tag 4, has been successfully performed, the control circuit 24 prints the print information included in the ID information stored in the RFID tag 4 on the label 3al with the printing portion 21. In contrast, when determining that the successful communication with the RFID tag 4, is not possible, the control circuit 24 only prints, with the printing portion 21, characters such as "VOID" on the label 3al and ejects the label 3al, thereby notifying the user that the label 3a1 is an unusable label 3al for which the communication has failed. In this case, the printer 1 issues a desired baggage tag using the subsequent label 3al in place of the label 3a1 for which the communication has failed.

The operation of the printer 1 in which the first paper feeding device 5A or the third paper feeding device 5C is connected to the printing device 6, is the same as the above-described operation except for the operation of communicating with the RFID tag 4. In the printer 1, the RFID interrogator 31 and the printing portion 21 may be arranged such that, after the center O of the RFID tag 4 of the elongate paper 3a is stopped at the communication position P1, the elongate paper 3a is forwarded by about 1 [mm] in the transfer direction to perform printing on the label 3a1 at the print start position P2. The time needed for printing is still shortened in this configuration, since the label 3a1 is not returned in the direction opposite to the transfer direction to perform printing on the label 3a1.

Effects of Embodiment

As described above, the printer 1 of the embodiment includes; different types of paper feeding devices 5A, 5B, and 5C each having the common connection portion 16, and the printing device 6, which includes the connector portion 28 that is selectively connectable to the common connection portion 16 of each of the paper feeding devices 5A, 5B, and 5C. The second paper feeding device 5B includes the RFID interrogator 31, which communicates with RFID tags 4 of the paper roll 3B with RFID, and the terminal portion 32, which electrically connects the RFID interrogator 31 to the printing device 6. As a result, when the paper roll 3B with RFID is used, it is possible to easily arrange the RFID interrogator 31 at a position away from the printing portion 21 according to the international standard regarding the position of the RFID tag 4 on the elongate paper 3a by separating the printing device 6 from the second paper feeding device 5b, while limiting an increase in size of the printing device 6. By appropriately securing the distance between the printing portion 21 and the RFID interrogator 31, the elongate paper 3a does not have to be returned in the direction opposite to the transfer direction of the elongate paper 3a to perform printing on the elongate paper 3a after the communication with the RFID tag 4. As a result, the time needed for printing after the communication with the RFID tag 4, can be shortened, thereby increasing the processing speed of communication and printing, and an increase in size of the printing device 6 is limited. The present embodiment is not restricted to the application of issuing baggage tags, and can, according to the specifications of various tags, easily secure the distance between the printing portion 21 and the RFID interrogator 31, increase the processing speed of communication and printing, and limit an increase in size of the printing device 6.

In addition, with the printer 1, a user, who does not use RFID tags 4, can use the second paper feeding device 5B as a retrofit when it becomes necessary to use RFID tags 4. This increases the expandability of the printer 1. Moreover, the printer 1 uses the printing device 6, which is common to different types of paper feeding devices irrespective of the use of RFID tags 4. This increases the serviceability of the printer 1.

In the printer 1 of the embodiment, the distance between a communication position P1, at which the RFID interrogator 31 communicates with the RFID tag 4, and the print start position P2, at which the thermal head 21a of the printing portion 21 starts printing on the label 3al of the elongate paper 3a, is equivalent to the distance between the front end of the elongate paper 3a in the transfer direction of the elongate paper 3a and the center O of the semiconductor chip 4a of the RFID tag 4 in the transfer direction of the elongate paper 3a. Thus, after communicating with the RFID tag 4, the printer 1 can quickly print without returning the elongate paper 3a in the direction opposite to the transfer direction, thereby increasing the processing speed of communication and printing.

The RFID interrogator 31 of the second paper feeding device 5B in the printer 1 of the embodiment, is arranged in the vicinity of the transfer passage 30. As a result, when the RFID interrogator 31 communicates with the RFID tag 4, which is drawn from the paper roll 3B with RFID, the radio wave is less likely to affect the other RFID tags 4, which is wound in the paper roll 3B with RFID.

The terminal portion 32 of the second paper feeding device 5B in the printer 1 of the embodiment, is provided in the common connection portion 16. The printing device 6 is thus connected to the second paper feeding device 5B via the common connection portion 16, facilitating the connection between the RFID interrogator 31 and the control circuit 24 of the printing device 6 via the terminal portion 32.

According to one aspect of the printer disclosed in the present application, it is possible to increase the processing speed of communication and printing on a print medium that has wireless communication elements, and to limit an increase in size of the printing device.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A printer system comprising:
different types of medium feeding devices including a first medium feeding device that feeds an elongate medium from a first print medium including the elongate medium, and a second medium feeding device that feeds a medium from a second print medium including the medium and a plurality of wireless communication elements provided at intervals in a longitudinal direction of the elongate medium; and
a printing device including a printing portion that performs printing on the medium fed from one of the different types of medium feeding devices,
wherein
the different types of medium feeding devices each include a common connection portion, which is a common construction of a respective constituent part of a medium feeding device of the different types of medium feeding devices, to be connected to the printing device,
the printing device includes a connector portion that is selectively connectable to the common connection portion of each of the different types of medium feeding devices, and
the second medium feeding device includes a wireless communication portion that communicates with the plurality of wireless communication elements, and a terminal portion that electrically connects the wireless communication portion to the printing device, and
the first medium feeding device is without the wireless communication portion.

2. The printer system according to claim 1, wherein in a transfer direction in which the second print medium is transferred from the second medium feeding device to the printing device, a distance between a communication position at which the wireless communication portion communicates with each wireless communication element with transfer of the medium being stopped and a print start position at which the printing portion starts printing on the medium, is equivalent to a distance between a front end of the medium in the transfer direction and a center of a wireless communication element of the plurality of wireless communication elements in the transfer direction.

3. The printer system according to claim 1, wherein the second medium feeding device includes a transfer passage through which the medium drawn from the second print medium passes, and the wireless communication portion is located in a vicinity of the transfer passage.

4. The printer system according to claim 1, wherein the terminal portion of the second medium feeding device is provided in the common connection portion.

5. The printer system according to claim 1, wherein the different types of medium feeding devices include a third medium feeding device that feeds a folded medium from a third print medium having the folded medium.

6. The printer system according to claim 1, wherein the common connection portion of each of the different types of medium feeding devices, as respective common connection portions have a same shape and are located at a same position.

7. The printer system according to claim 1, wherein each of the different types of medium feeding devices is formed such that a bottom surface of each medium feeding device, from among the different types of medium feeding devices, is placed on a mounting surface on which a bottom surface of the printing device is mounted, when the common connection portion is connected to the connector portion of the printing device.

* * * * *